United States Patent
Brooks et al.

(10) Patent No.: US 10,603,983 B2
(45) Date of Patent: *Mar. 31, 2020

(54) PRESSURIZATION SYSTEM FOR AN AGRICULTURAL MACHINE

(71) Applicant: CNH Industrial America LLC, New Holland, PA (US)

(72) Inventors: Nathan Brooks, Manitowoc, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 172 days.

This patent is subject to a terminal disclaimer.

(21) Appl. No.: 15/457,096

(22) Filed: Mar. 13, 2017

(65) Prior Publication Data
US 2018/0257455 A1  Sep. 13, 2018

(51) Int. Cl.
 B60H 1/00 (2006.01)
 A01M 7/00 (2006.01)

(52) U.S. Cl.
 CPC ..... B60H 1/00821 (2013.01); B60H 1/00378 (2013.01); B60H 1/00792 (2013.01); A01M 7/0042 (2013.01)

(58) Field of Classification Search
 CPC ............ B60H 1/00735; B60H 1/00821; B60H 1/00985; A01C 23/00
 See application file for complete search history.

(56) References Cited

U.S. PATENT DOCUMENTS

| | | | |
|---|---|---|---|
| 4,113,175 A * | 9/1978 | Sutton, Jr. | A01K 1/007 236/46 A |
| 4,467,706 A | 8/1984 | Batcheller et al. | |
| 4,581,988 A | 4/1986 | Mattei | |
| 4,788,903 A | 12/1988 | Johnson | |
| 4,989,499 A | 2/1991 | Scoccia et al. | |
| 5,257,736 A * | 11/1993 | Roy | F24F 7/08 236/49.3 |
| 5,413,528 A | 5/1995 | Pabst et al. | |
| 5,902,182 A * | 5/1999 | Kramer | B01D 46/12 454/255 |
| 6,283,849 B1 | 9/2001 | Shields | |
| 6,321,997 B1 * | 11/2001 | Kalsnes | F23L 5/02 237/46 |
| 7,294,181 B1 | 11/2007 | Smith | |
| 7,681,630 B2 | 3/2010 | Klassen et al. | |

(Continued)

FOREIGN PATENT DOCUMENTS

DE  10132891 A1  1/2003
EP   2660085 A1  11/2013

*Primary Examiner* — Thomas E Worden
(74) *Attorney, Agent, or Firm* — Rebecca L. Henkel; Rickard K. DeMille

(57) ABSTRACT

Agricultural machines such as sprayers can be improved by providing pressure sensors inside and outside of the operator cab, a cab sensor for sensing an open or closed state of the operator cab, and a controller configured to activate/deactivate an airflow system according to the pressure sensors and the cab sensor. Accordingly, the controller can activate the airflow system to provide a positive pressure differential in the operator cab (higher pressure in the operator cab/lower pressure external to the operator cab), and deactivate the airflow system when the operator cab is in the open state to maximize the life of the system.

18 Claims, 4 Drawing Sheets

(56) References Cited

U.S. PATENT DOCUMENTS

| | | | |
|---|---|---|---|
| 7,832,223 B2 | 11/2010 | Arshad et al. | |
| 8,056,617 B2 | 11/2011 | Klassen et al. | |
| 8,633,424 B2 | 1/2014 | Chernyavsky et al. | |
| 2003/0010129 A1* | 1/2003 | Gu | G01L 9/0055 73/716 |
| 2005/0069425 A1* | 3/2005 | Gray | A61M 5/14224 417/392 |
| 2005/0230096 A1* | 10/2005 | Yamaoka | B60H 1/03 165/202 |
| 2006/0111875 A1* | 5/2006 | Breen | F16K 37/0091 702/188 |
| 2008/0220710 A1 | 9/2008 | Nonnenmacher et al. | |
| 2009/0120517 A1* | 5/2009 | Whitney | B60P 3/005 137/624.27 |
| 2010/0216384 A1* | 8/2010 | McCarthy | B60H 1/249 454/70 |
| 2010/0236770 A1* | 9/2010 | Pursifull | B60H 1/00764 165/202 |
| 2013/0267157 A1* | 10/2013 | Park | B60H 1/008 454/70 |
| 2014/0305626 A1* | 10/2014 | Jange | B60H 1/00828 165/204 |
| 2014/0345467 A1 | 11/2014 | Viglione et al. | |
| 2015/0300640 A1* | 10/2015 | Smith | F23N 3/082 431/12 |
| 2016/0061680 A1* | 3/2016 | Knijnenburg | G01L 13/06 73/753 |
| 2017/0334573 A1* | 11/2017 | Waigl | B64C 25/001 |
| 2018/0264910 A1* | 9/2018 | Guerineau | B60H 1/00378 |
| 2018/0288932 A1* | 10/2018 | Winkel | A01B 73/00 |

\* cited by examiner

PRESSURIZATION SYSTEM FOR AN AGRICULTURAL MACHINE

FIELD OF THE INVENTION

The invention relates generally to agricultural product application equipment such as self-propelled sprayers and, in particular, to a pressurization system for agricultural machines in which an airflow system can be activated for providing a positive pressure differential in an operator cab when the operator cab is in a closed state and deactivated when the operator cab is in an open state.

BACKGROUND OF THE INVENTION

High-clearance sprayers are getting larger and more complex to allow for increasing coverage in a single pass. Such sprayers oftentimes include operator comfort improvements like Heating, Ventilation and Air Conditioning (HVAC) systems to reduce operator stress and fatigue during long application sessions. Such HVAC systems can be designed to draw ambient air external to the operator cab, filter dust and/or other airborne materials from such air, and provide the air to the operator cab. However, these HVAC systems typically operate continuously while the machine is running, regardless of the state of the machine. As a result, if there is an opening the operator cab, the system may operate excessively, thereby shortening the life of the system. A need therefore exists for an improved system which eliminates one or more of the foregoing disadvantages.

SUMMARY OF THE INVENTION

Agricultural machines such as sprayers can be improved by providing pressure sensors inside and outside of the operator cab, a cab sensor for sensing an open or closed state of the operator cab, and a controller configured to activate/deactivate an airflow system according to the pressure sensors and the cab sensor. Accordingly, the controller can activate the airflow system to provide a positive pressure differential in the operator cab (higher pressure in the operator cab/lower pressure external to the operator cab), and deactivate the airflow system when the operator cab is in the open state to maximize the life of the system.

According to an aspect of the invention, sensors can be arranged for detecting conditions of a cab pressurization system and other components of an HVAC system for corresponding control and system monitoring. Pressure sensors can be mounted inside and outside of the cab. A sensor can be arranged at the door of the cab to turn off the fan if the door is open via a machine controller. In one aspect, a pressure differential can be measured between the inside and outside of the cab by way of the inside and outside pressure sensors. The cab pressure system and other HVAC components can be monitored and controlled based on sensed conditions. For example, the pressurizer can be controlled to maintain a target value of pressurization in the cab based on the detected pressure differential. An alarm or other indicator can alert the operator when cab pressure is low. Also, performance characteristics, such as compressor hours, can be logged. The system can also electronically determine if a filter which protects the operator may require replacement. Advantages can include longer part life, reduced warranty costs, improved conditions for operators, and/or monitoring of important system characteristics.

Specifically then, one aspect of the present invention may provide a pressurization system for an agricultural machine including: an operator cab; an airflow system configured to draw ambient air into the operator cab; a first pressure sensor configured to sense a first pressure in the operator cab; a second pressure sensor configured to sense a second pressure external to the operator cab; a cab sensor configured to sense an open or closed state of the operator cab; and a controller in communication with the airflow system, the first and second pressure sensors and the cab sensor. The controller can execute a program stored in a non-transient medium operable to: (a) determine a pressure differential by calculating a difference between the first and second pressures, where the pressure differential is positive when the first pressure is greater than the second pressure; (b) activate the airflow system to provide a positive pressure differential when the cab sensor indicates the operator cab is in the closed state; and (c) deactivate the airflow system when the cab sensor indicates the operator cab is in the open state.

Another aspect may provide a method for pressurizing an operator cab of an agricultural machine including: drawing ambient air into the operator cab with an airflow system; sensing a first pressure in the operator cab with a first pressure sensor; sensing a second pressure external to the operator cab with a second pressure sensor; sensing an open or closed state of the operator cab with a cab sensor; determining a pressure differential by calculating a difference between the first and second pressures, where the pressure differential is positive when the first pressure is greater than the second pressure; activating the airflow system to provide a positive pressure differential when the cab sensor indicates the operator cab is in the closed state; and deactivating the airflow system when the cab sensor indicates the operator cab is in the open state.

Another aspect may provide an agricultural sprayer including: a chassis supported by multiple wheels, the chassis supporting an engine, a drive system, a lift arm assembly and an operator cab having a cab door; a sprayer boom connected to the lift arm assembly; an airflow system configured to draw ambient air into the operator cab; a first pressure sensor configured to sense a first pressure in the operator cab; a second pressure sensor configured to sense a second pressure external to the operator cab; a cab sensor configured to sense an open or closed state of the cab door; and a controller in communication with the airflow system, the first and second pressure sensors and the cab sensor. The controller can execute a program stored in a non-transient medium operable to: (a) determine a pressure differential by calculating a difference between the first and second pressures, where the pressure differential is positive when the first pressure is greater than the second pressure; (b) activate the airflow system to provide a positive pressure differential when the cab sensor indicates the cab door is in the closed state; and (c) deactivate the airflow system when the cab sensor indicates the cab door is in the open state.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
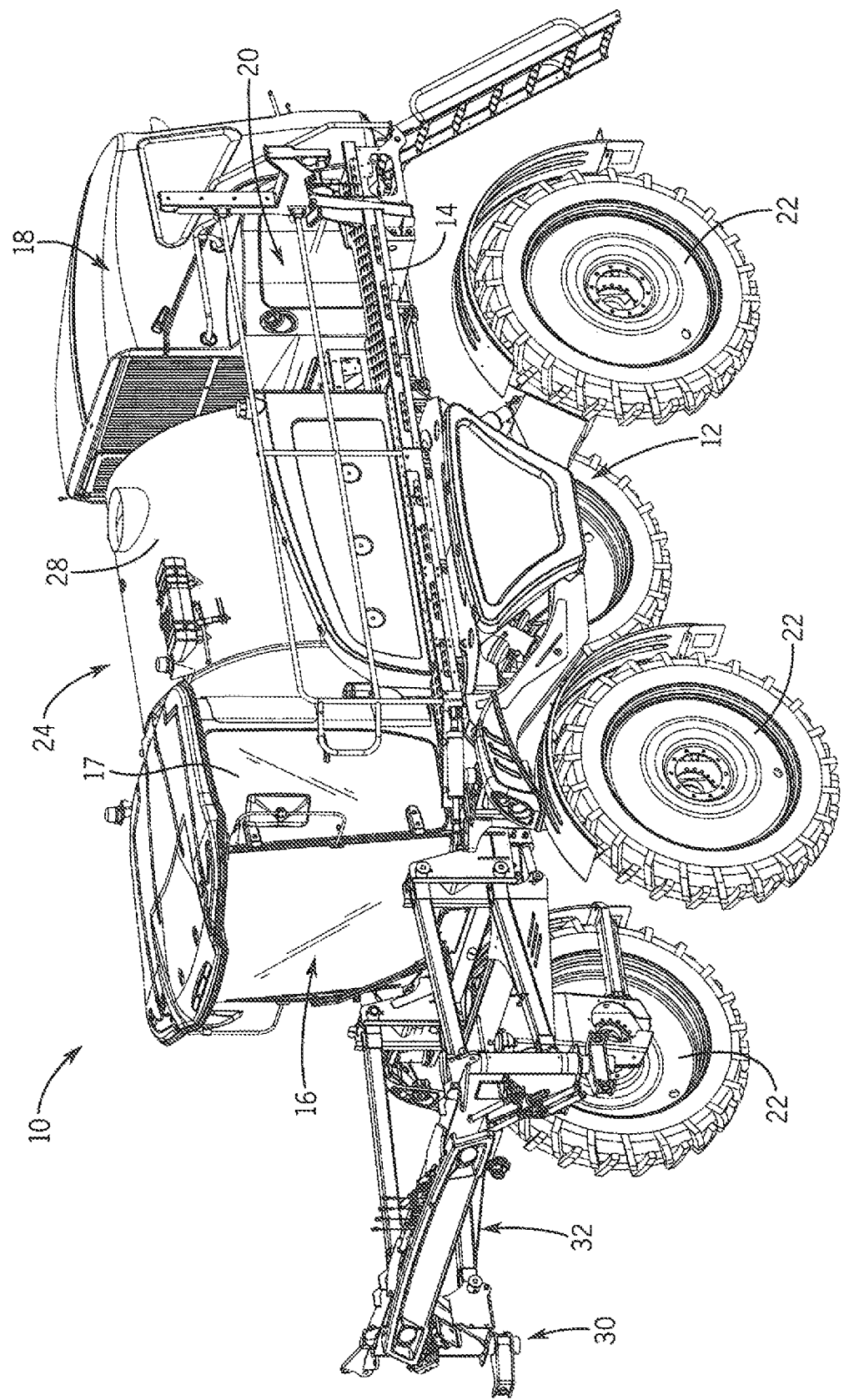
FIG. 1 is an isometric view of an agricultural machine in accordance with an aspect of the invention.

Referring now to the drawings and specifically to FIG. 1, aspects of the invention are shown for use with an agricultural machine which could be an agricultural sprayer. The agricultural sprayer is shown here as a self-propelled agricultural sprayer vehicle or self-propelled sprayer 10. Although sprayer 10 is shown as a front-mounted boom self-propelled sprayer, it is understood that self-propelled versions of sprayer 10 can have either front-mounted or rear-mounted booms, such as those available from CNH Industrial, including the Miller Nitro and Condor Series sprayers and New Holland Guardian Series sprayers.

Still referring to FIG. 1, sprayer 10 includes a chassis 12 having a chassis frame 14 that supports various assemblies, systems, and components. These various assemblies, systems, and components can include an operator cab 16 having a cab door 17, an engine 18 and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as rinse tank for storing water or a rinsing solution and a product tank 28 for storing a volume of product for delivery onto an agricultural field with sprayer 10. A product delivery pump can convey product from the product tank 28 through plumbing components such as interconnected pieces of tubing and through a boom tubing system for release out of spray nozzles that are spaced from each other along the width of boom 30 during spraying operations of sprayer 10. Groups or banks of multiple adjacent spray nozzles define multiple spray sections of the spray system. Spray sections are defined along boom 30 and selectively deliver product for release onto an agricultural field at locations corresponding to positions of activated spray sections. Boom 30 is connected to chassis 12 with lift arm assembly 32 that is configured to move the boom 30 up and down for adjusting the height of application of the product.

Figure 2:
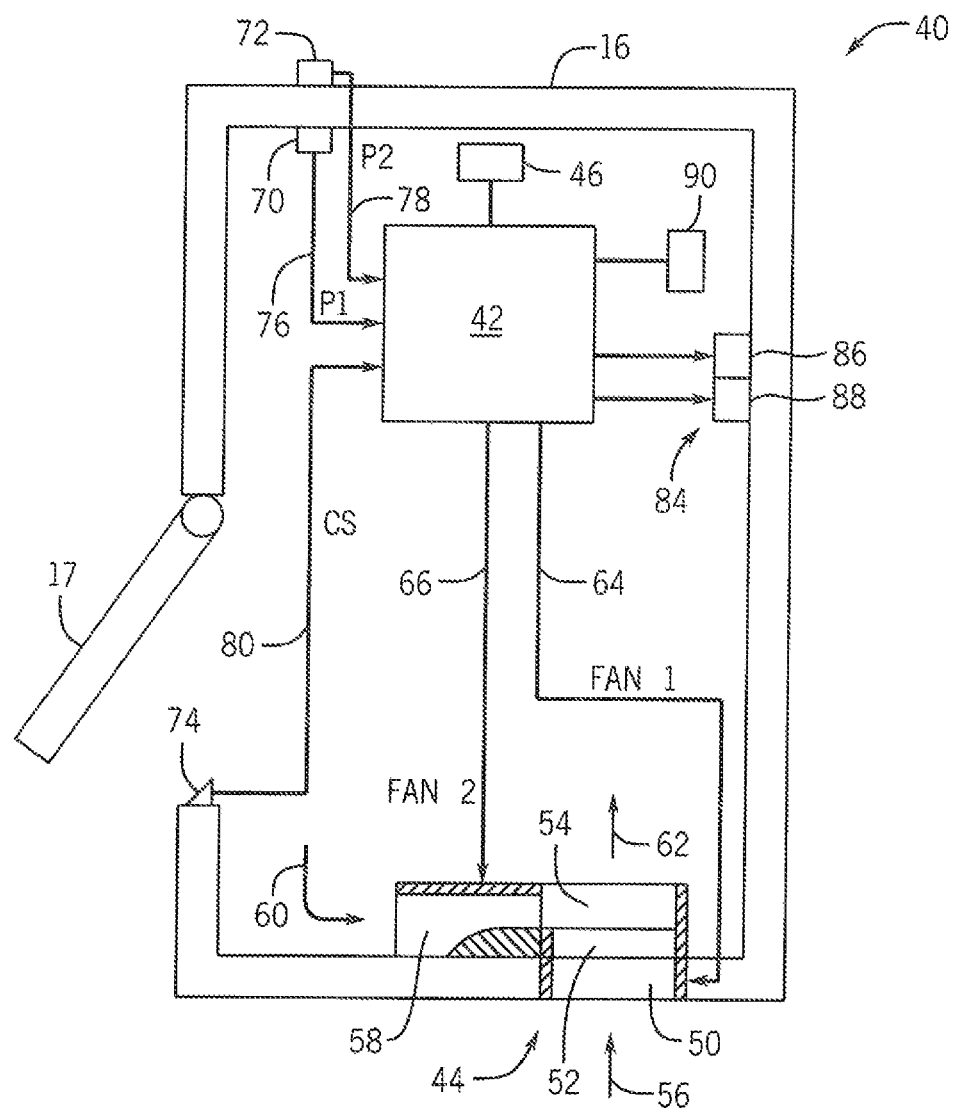
FIG. 2 is block diagram of a pressurization system implemented with respect to an operator cab of the machine of FIG. 1 in accordance with an aspect of the invention.

Referring now to FIG. 2, a block diagram of a pressurization system 40 which may be implemented with respect to the operator cab 16 of the sprayer 10 is provided in accordance with an aspect of the invention. The pressurization system 40 can include a controller 42 in communication with an airflow system 44 and multiple sensors as will be described. The controller 42 can be a microprocessor, a microcontroller or other programmable logic element configured to execute a program stored in a non-transient medium 46 as known the art. The controller 42 can be in communication with the airflow system 44 for controlling operation of airflow with respect to the operator cab 16. In one aspect, the airflow system 44 can include a first fan 50 configured to draw ambient air through an air filter 52, so as to remove dust and/or other airborne materials from such air, into a mixing chamber 54 in a first air stream 56. The airflow system 44 can also include a second fan 58 configured to draw air from the operator cab 16 into the mixing chamber 54 in a second air stream 60. The first and second air streams 56 and 60, respectively, can then mix in the mixing chamber 54 and release into the operator cab 16 in a third air stream 62. The controller 42 can control activation, variable speed and/or deactivation of the first and second fans 50 and 58, respectively, via first and second fan control signals 64 and 66, respectively (labelled "FAN1" and "FAN2").

In addition, the controller 42 can be in communication with first and second pressure sensors 70 and 72, respectively, and one or more cab sensors 74. The first pressure sensor 70 can be configured to sense a first pressure in the operator cab 16, and indicate that first pressure to the controller 42 via a first pressure signal 76 (labelled "P1"). The second pressure sensor 72 can be configured to sense a second pressure external to the operator cab 16, and indicate that second pressure to the controller 42 via a second pressure signal 78 (labelled "P2"). Each cab sensor 74 can be configured to sense an open or closed state of the operator cab 16, and indicate that open or closed state to the controller 42 via a cab sensor signal 80 (labelled "CS"). Multiple cab sensors 74 can be used for each door, window or other opening from the operator cab 16 to the external environment. When a door, window or other opening is opened, a corresponding cab sensor 74 can sense the open position and indicate an "open state" to the controller 42. Conversely, when the door, window or other opening is closed, the corresponding cab sensor 74 can sense the closed position and indicate a "closed state" to the controller 42. Cab sensors 74 can be implemented, for example, as door switches, such as a door switch variety as shown with respect to door 17 in FIG. 2 by way of example, or as other detection elements known in the art.

The controller 42 can also be in communication with an alarm system 84 and a timing system 90. The controller 42 can activate one or more aspects of the alarm system 84 to warn the operator of various conditions as will be described, such as illumination of a visual indicator 86, which could be an Light Emitting Diode (LED) and/or text displayed to a Human Machine Interface (HMI) or other screen, and/or an audible indicator 88, which could be a speaker for emitting a warning sound or stating a warning message. The controller 42 can also utilize the timing system 90 for timing various conditions as will be described for monitoring and/or reporting.

Figure 3:
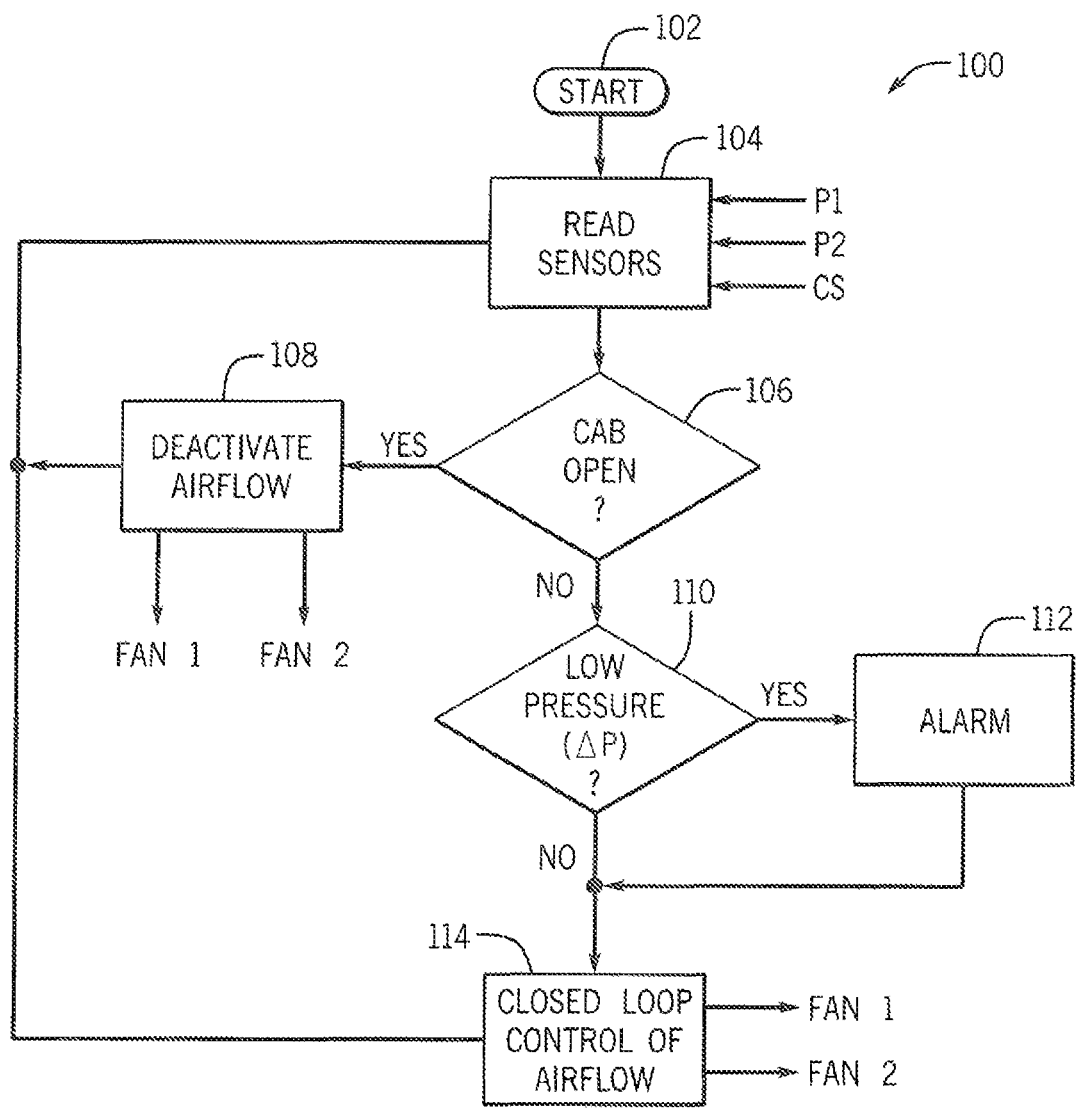
FIG. 3 is a flow diagram for the pressurization system of FIG. 2.

With additional reference to FIG. 3, a flow diagram 100, which can be executed by the controller 42 in the pressurization system 40, is shown by way of example. In operation, following power-up/initialization at block 102, the controller 42 can read all sensors in the pressurization system 40, including the first and second pressure sensors 70 and 72, respectively, and the one or more cab sensors 74 at block 104. Next, at decision block 106, the controller 42 can determine an open or closed state of the operator cab 16 by analyzing the indicated state for each of the cab sensors 74. If any one of the cab sensors 74 indicates an open state (such as the door 17 being sensed in an open position), the controller 42 can default to an open state and proceed to block 108 to deactivate the airflow system 44. The controller 42 can deactivate the airflow system 44, for example, by deactivating the first and/or second fans 50 and 58, respectively, and then return to the block 104 to read the sensors. This first loop, between block 104, decision block 106, and block 108, can continue as long as the controller 42 determines the operator cab 16 to be in an open state.

However, at decision block 106, if the controller 42 determines the operator cab 16 to be in a closed state, which can occur when all cab sensors 74 indicate a closed state (such as the door 17 being sensed in a closed position), the controller 42 can exit the aforementioned first loop. Accordingly, the flow diagram 100 can proceed to decision block 110 in which the controller 42 can determine whether a low pressure condition exists in the operator cab 16. With additional reference to FIG. 4, in one aspect, to determine whether a low pressure condition exists in the operator cab 16, the controller 42 can determine a pressure differential (labelled "ΔP") by calculating a difference between the first and second pressures indicated by the first and second pressure signals 76 and 78, respectively. The pressure differential is positive when the first pressure (in the operator cab 16) is greater than the second pressure (external to the operator cab 16). The controller 42 can then compare the pressure differential to a predetermined activation threshold 120, which can be a positive minimum atmospheric pressure value. If the pressure differential is below the predetermined activation threshold 120, the flow diagram 100 can proceed to block 112 in which the controller 42 activates the alarm system 84, such as activation of a visual or audible indicator. Then, the flow diagram 100 can proceed to block 114 in which the controller 42 can execute a closed loop control of the airflow system 44 to achieve and maintain a set positive pressure in the operator cab 16, such as by activating the first and/or second fans 50 and 58, respectively, in a control loop to provide a positive set pressure differential in the operator cab 16. This can advantageously keep the system from overworking while providing operator comfort. However, if the pressure differential is already above the predetermined activation threshold 120, the controller 42 can bypass block 112 and proceed directly to block 114 to maintain the set positive pressure differential in the operator cab 16. The flow diagram 100 can continue to monitor the sensors while executing closed loop control of the airflow system 44. While the controller 42 determines the operator cab 16 to be in the closed state, the flow diagram 100 can continue in this second loop, between block 104, decision blocks 106 and 110, and block 114 (with optional block 112), with activation, variable speed and/or deactivation of the airflow system 44, such as via the fans, as needed to provide/maintain a positive set pressure differential in the operator cab 16.

Figure 4:
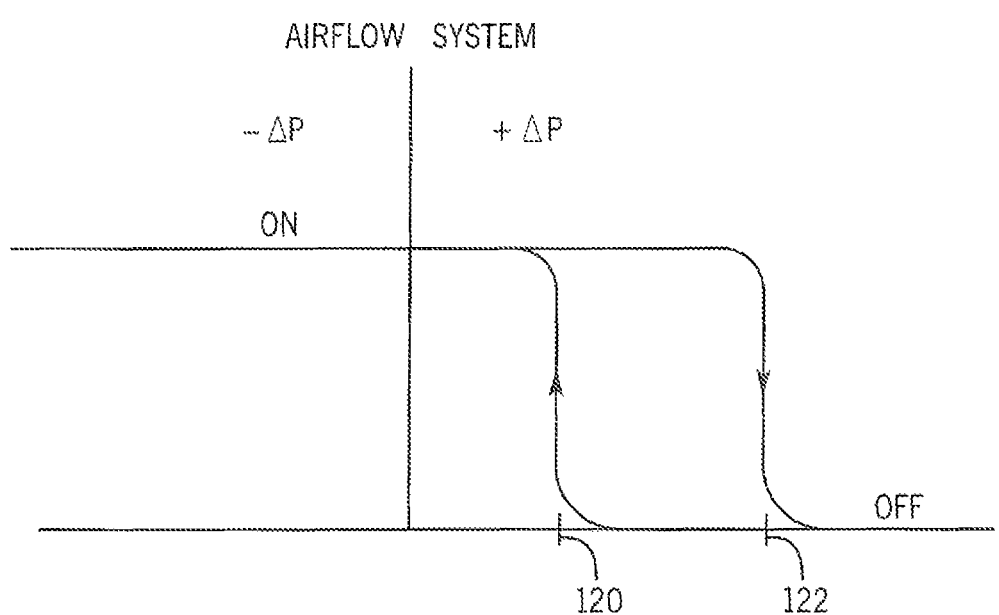
FIG. 4 is a state diagram for an airflow system of the pressurization system of FIG. 3.

In addition, the controller 42 can be configured to apply hysteresis before activating and/or deactivating the airflow system 44. For example, as shown in FIG. 4, although the predetermined activation threshold 120 can be used to determine when the airflow system 44 is activated ("ON"), once activated, a predetermined deactivation threshold 122, which can be a positive atmospheric pressure value that is greater than the positive minimum atmospheric pressure value, can be used to determine when the airflow system 44 is deactivated ("OFF") so as to avoid an excess positive pressure differential build up in the operator cab 16. In this way, minor pressure variations between the predetermined activation threshold 120 and the predetermined deactivation threshold 122 will not cause undesirable frequent changes with respect to the state of the airflow system 44.

Also, the controller 42 can be configured to monitor an elapsed time for activation of the airflow system 44, which can be an accumulation of periods of time in which the airflow system 44 is ON. In this way, performance characteristics, such as compressor hours, can be logged, and the controller 42 can electronically determine if the filter 52 should be replaced with a warning via the alarm system 84.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A pressurization system for an agricultural machine comprising:
    an operator cab having an access movable between an open state allowing for an egress of ambient air out of the operator cab therethrough and a closed state for preventing the egress of ambient air out of the operator cab therethrough to an external environment;
    an airflow system including a fan, the fan being configured to draw ambient air into the operator cab;
    a first pressure sensor configured to sense a first pressure in the operator cab;
    a second pressure sensor configured to sense a second pressure external to the operator cab;
    a cab sensor configured to sense an open or closed state of the access of the operator cab; and
    a controller in communication with the airflow system, the first and second pressure sensors and the cab sensor, the controller executing a program stored in a non-transient medium operable to:
    (a) determine a pressure differential by calculating a difference between the first and second pressures, wherein the pressure differential is positive when the first pressure is greater than the second pressure;
    (b) activate the fan of the airflow system to draw ambient air into the operator cab so as to provide a positive pressure differential when the cab sensor indicates the access of the operator cab is in the closed state and egress of ambient air out of the operator cab to the external environment is prevented; and
    (c) deactivate the airflow system when the cab sensor indicates the operator cab is in the open state.

2. The pressurization system of claim 1, wherein the access is at least one of a door and a window and wherein the cab sensor is configured to sense an open position of the door or the window of the operator cab in the open state and a closed position of the door or the window of the operator cab in the closed state.

3. The pressurization system of claim 2, wherein the airflow system includes an air filter, wherein the controller is operable to deactivate the airflow system by deactivating the fan.

4. The pressurization system of claim 3, wherein the fan is a first fan, and the airflow system further comprises a second fan, wherein the first fan draws ambient air through the air filter into a mixing chamber in a first air stream, and the second fan draws air from the operator cab into the mixing chamber in a second air stream, wherein the first and second air streams mix in the mixing chamber for release into the operator cab.

5. The pressurization system of claim 1, further comprising an alarm system, wherein the controller is operable to activate the alarm system when the pressure differential is negative.

6. The pressurization system of claim 5, wherein activation of the alarm system comprises illumination of a visual indicator in the operator cab.

7. The pressurization system of claim 1, wherein the controller activates the airflow system with closed loop control to achieve a set positive pressure differential.

8. The pressurization system of claim 7, wherein the controller is configured to apply hysteresis before activating or deactivating the airflow system.

9. The pressurization system of claim 1, wherein the controller is configured to monitor an elapsed time for activation of the airflow system.

10. A method for pressurizing an operator cab of an agricultural machine comprising:
  drawing ambient air into the operator cab with a fan of an airflow system;
  sensing a first pressure in the operator cab with a first pressure sensor;
  sensing a second pressure external to the operator cab with a second pressure sensor;
  sensing an open or closed state of the operator cab with a cab sensor;
  preventing the egress of ambient air from the operator cab with the operator cab in the closed state;
  determining a pressure differential by calculating a difference between the first and second pressures, wherein the pressure differential is positive when the first pressure is greater than the second pressure;
  activating the fan of the airflow system to draw ambient air into the operator cab so as to provide a positive pressure differential when the cab sensor indicates the operator cab is in the closed state and the egress of ambient air out of the operator cab to an external environment outside of the operator cab is prevented; and
  deactivating the airflow system when the cab sensor indicates the operator cab is in the open state.

11. The method of claim 10, further comprising the cab sensor sensing an open position of a door or window of the operator cab in the open state and a closed position of the door or window of the operator cab in the closed state.

12. The method of claim 11, wherein the airflow system comprises a fan and an air filter, and further comprising deactivating the airflow system by deactivating the fan.

13. The method of claim 10, further comprising activating an alarm system when the pressure differential is negative.

14. The method of claim 10, further comprising activating the airflow system with closed loop control to achieve a set positive pressure differential.

15. The method of claim 14, further comprising applying hysteresis before activating or deactivating the airflow system.

16. The method of claim 10, further comprising monitoring an elapsed time for activation of the airflow system.

17. An agricultural sprayer comprising:
  a chassis supported by a plurality of wheels, the chassis supporting an engine, a drive system, a lift arm assembly, and an operator cab having a cab door;
  a sprayer boom connected to the lift arm assembly;
  an airflow system including a fan configured to draw ambient air into the operator cab;
  a first pressure sensor configured to sense a first pressure in the operator cab;
  a second pressure sensor configured to sense a second pressure external to the operator cab;
  a cab sensor configured to sense an open or closed state of the cab door, the cab door preventing the egress of air from the operator cab with the cab door in the closed state; and
  a controller in communication with the airflow system, the first and second pressure sensors and the cab sensor, the controller executing a program stored in a non-transient medium operable to:
    (a) determine a pressure differential by calculating a difference between the first and second pressures, wherein the pressure differential is positive when the first pressure is greater than the second pressure;
    (b) activate the fan of the airflow system to draw ambient air into the operator cab so as to provide a positive pressure differential when the cab sensor indicates the cab door is in the closed state and the egress of ambient air out of the operator cab to an external environment outside of the operator cab is prevented; and
    (c) deactivate the airflow system when the cab sensor indicates the cab door is in the open state.

18. The agricultural sprayer of claim 17, wherein the controller activates the airflow system until a minimum positive pressure differential is achieved and then deactivates the airflow system.

* * * * *